US010015064B2

(12) United States Patent
Li et al.

(10) Patent No.: US 10,015,064 B2
(45) Date of Patent: Jul. 3, 2018

(54) PERSONALIZATION OF INFORMATION CONTENT BY MONITORING NETWORK TRAFFIC (75) Inventors: Dekai Li, Lawrenceville, GA (US); Ashwin Kashyap, Mountain View, CA (US); Saurabh Mathur, Monmouth Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 242 days.

(21) Appl. No.: 13/817,216

(22) PCT Filed: Aug. 19, 2010

(86) PCT No.: PCT/US2010/002303
§ 371 (c)(1),
(2), (4) Date: Feb. 15, 2013

(87) PCT Pub. No.: WO2012/023921
PCT Pub. Date: Feb. 23, 2012

(65) Prior Publication Data
US 2014/0012982 A1  Jan. 9, 2014

(51) Int. Cl.
*G06F 15/16* (2006.01)
*H04L 12/26* (2006.01)
(Continued)

(52) U.S. Cl.
CPC .............. *H04L 43/04* (2013.01); *H04L 67/22* (2013.01); *H04L 67/303* (2013.01);
(Continued)

(58) Field of Classification Search
CPC ..................... H04L 67/306; H04L 65/102
(Continued)

(56) References Cited

U.S. PATENT DOCUMENTS 7,577,645 B2  8/2009  Yamamoto et al.
7,587,382 B2  9/2009  Yamamoto et al.
(Continued)

FOREIGN PATENT DOCUMENTS

CN  101385342  3/2009
EP     1978700  10/2008
(Continued)

OTHER PUBLICATIONS

Henzinger et al: "Query Free News Search" Proceedings of the 12th International World Wide Web Conference, 2003. May 20-24, 2003 Budapest, Hungary.
(Continued)

*Primary Examiner* — Brian J Gillis
*Assistant Examiner* — Kamran Mohammadi
(74) *Attorney, Agent, or Firm* — Tutunjian & Bitetto, P.C.

(57) ABSTRACT

A home network system that personalizes the selection of information content in accordance with an interest of a user of the network is disclosed. More specifically, a method and apparatus are described for automatically presenting an information content of interest to the user, being provided by an Internet site external to the network. The contents of interest may be determined in accordance with an access pattern of the user and a frequency of the use of particular topic in the content.

8 Claims, 7 Drawing Sheets (51) Int. Cl.
  *H04N 21/442* (2011.01)
  *H04N 21/462* (2011.01)
  *H04N 21/466* (2011.01)
  *H04N 21/482* (2011.01)
  *H04L 29/08* (2006.01)
  *H04N 21/436* (2011.01)

(52) U.S. Cl.
  CPC ... *H04N 21/44222* (2013.01); *H04N 21/4622* (2013.01); *H04N 21/4667* (2013.01); *H04N 21/4668* (2013.01); *H04N 21/4826* (2013.01); *H04N 21/43615* (2013.01)

(58) Field of Classification Search
  USPC .............................................. 725/110, 14, 46
  See application file for complete search history.

(56) References Cited

U.S. PATENT DOCUMENTS

| | | | |
|---|---|---|---|
| 8,954,538 | B2 | 2/2015 | Erickson et al. |
| 2001/0003823 | A1 | 6/2001 | Mighdoll et al. |
| 2002/0048269 | A1* | 4/2002 | Hong ............... H04L 29/06 370/389 |
| 2002/0194226 | A1 | 12/2002 | Sheth et al. |
| 2004/0043758 | A1 | 3/2004 | Sorvari et al. |
| 2006/0095422 | A1 | 5/2006 | Kikuchi |
| 2006/0123448 | A1 | 6/2006 | Ma et al. |
| 2006/0129547 | A1 | 6/2006 | Yamamoto et al. |
| 2006/0294093 | A1 | 12/2006 | Yamamoto et al. |
| 2007/0157220 | A1 | 7/2007 | Cordray et al. |
| 2007/0157222 | A1 | 7/2007 | Cordray et al. |
| 2007/0186269 | A1* | 8/2007 | Malik ............... H04N 7/17318 725/135 |
| 2007/0214477 | A1 | 9/2007 | Read |
| 2007/0266403 | A1* | 11/2007 | Ou ............... G06Q 30/02 725/46 |
| 2008/0120165 | A1* | 5/2008 | Yan ............... G06Q 30/02 705/342 |
| 2008/0139112 | A1 | 6/2008 | Sampath et al. |
| 2008/0195607 | A1 | 8/2008 | Kutsumi et al. |
| 2009/0006308 | A1* | 1/2009 | Fonsen ............. G06F 17/30902 |
| 2009/0019488 | A1 | 1/2009 | Ruiz-Velasco et al. |
| 2009/0271822 | A1 | 10/2009 | Lee et al. |
| 2010/0138867 | A1* | 6/2010 | Wong ............... G06F 17/30749 725/46 |
| 2011/0078775 | A1* | 3/2011 | Yan ............... G06F 21/57 726/6 |
| 2011/0131168 | A1 | 6/2011 | Fukazawa et al. |
| 2011/0162025 | A1* | 6/2011 | Kellerman ....... H04N 21/26208 725/116 |
| 2011/0283014 | A1* | 11/2011 | Malik ............... H04L 47/10 709/233 |
| 2013/0124554 | A1 | 5/2013 | Linyard et al. |
| 2013/0145023 | A1 | 6/2013 | Li et al. |
| 2014/0289753 | A1 | 9/2014 | White et al. |

FOREIGN PATENT DOCUMENTS

| | | | |
|---|---|---|---|
| EP | 2015577 | | 1/2009 |
| EP | 2113847 | | 11/2009 |
| EP | 2178269 | A1 * | 4/2010 ............. G06Q 30/02 |
| JP | 2003208384 | | 7/2003 |
| JP | 2003132087 | | 9/2003 |
| JP | 2004194108 | | 7/2004 |
| JP | 2005228000 | | 8/2005 |
| JP | 2006324763 | | 11/2006 |
| JP | 2008/263512 | | 10/2008 |
| JP | 2009116845 | | 5/2009 |
| JP | 2009521027 | | 5/2009 |
| JP | 2009522861 | | 6/2009 |
| WO | WO 01/22310 | | 3/2001 |
| WO | WO 02/07013 | | 1/2002 |
| WO | WO07071529 | | 6/2007 |
| WO | WO07078847 | | 7/2007 |
| WO | WO 2008/033598 | | 3/2008 |
| WO | WO 2009/068675 | | 6/2009 |

OTHER PUBLICATIONS

Messer Et Al: :SeeNSearch: A Context Directed Search Facilitator for Home Entertainment Devices, Pervasive and Mobile Computing, vol. 4, Issue 6, Dec. 2008. pp. 20-29.
Fink Et Al: "Social- and Interactive-television Applications Based on Real-Time Ambient-Audio Identification" Proceedings of Euro-ITV, 2006.
PCT Search Report dated Jun. 9, 2011.
Notice of Allowance for related U.S. Appl. No. 13/817,029 dated Aug. 10, 2015.
Search Report for related CN Application No. 2010800686586 dated Dec. 17, 2014.
Search Report for corresponding CN Application No. 201080068649.7 dated Nov. 10, 2015.
Office Action for related U.S. Appl. No. 13/817,029 dated Nov. 10, 2014.

* cited by examiner

PERSONALIZATION OF INFORMATION CONTENT BY MONITORING NETWORK TRAFFIC

This application is a National Stage Application and claims the benefit, under 35 U.S.C. § 365 of International Application PCT/US2010/002303 filed Aug. 19, 2010 which was published in accordance with PCT Article 21(2) on Feb. 23, 2012 in English.

The present application relates to networks in general and, in particular, to a method and apparatus for personalizing information content by monitoring a device's data traffic with a network.

In home networking environment, several home network devices are connected either with wire or wirelessly to form a local area network. Such an internal local area network often connected to an external network, such as the Internet, via a network interface device known as a gateway. The internal local home network devices may include, but are not limited to, a set-top-box (STB) coupled to a display screen device for display along with a remote controller for data input, a personal computer (PC) coupled to a video display monitor along with a keyboard and a mouse for data input, a laptop computer including a display and a combination of keyboard and touch pad for data input, and a mobile internet device (MID) with or without a display or touch screen for display and data input. Some of these internal network devices may also reproduce audio sounds.

Using internal network devices, a user may enjoy gathering data, visiting web pages, watching IPTV programs, and/or listening to IP radio programs, all of which contents may be of an interest to the user. Furthermore, a user may wish to locate the latest version of the information content in which the user is personally interested (such as the latest price of a particular stock), available on the Internet, while watching a user's favorite television program. In a conventional system, the user needs manually to get access to one of the Internet service providers (ISPs) to gather such a content and then display the content on the television screen, activating a small user interface application program (called "a widget").

This entire process of manually accessing to one's favorite contents may be cumbersome to a user. Especially, when user's interest changes from one type of content to another type of content (such as from the current stock price to the current local weather), the user needs to reselect a new content matching to user's new interest inconveniently.

A conventional way to solve this manual access problem is to have a system automatically identify the current television program content on the screen and then locate related information contents available on the Internet. For example, Samsung's "SeeNSearch" uses television closed caption data for retrieving a related information content available on the Internet. Similarly, Google's "Query-Free News Search" uses closed caption data for locating a related news content available on the Internet. In addition, the television sound may also be utilized to identify the current television program content as its vocal sounds may be converted into text.

It is noted that these conventional automatic content gathering schemes are performed merely based upon the content of the currently-watched television program, which content may or may not accurately represent the topic(s) of the contents in which a particular user (or a group of users, such as a household) is (are) truly interested. This is because any single program content being watched at a particular moment may or may not actually indicate the program content that may be of more or less interest to a user (or a group of users). Thus, it is desirable to have a home network system capable of automatically providing a user with the program contents that may be of interest to the user.

In accordance with an aspect of the present invention, a method is disclosed. According to an exemplary embodiment, the method comprises monitoring data traffic at a gateway coupling between first and second data networks, the first data network including a first device having an input for receiving a control data for interactively operating with a second device on the second data network; analyzing the monitored traffic data to identify a more-frequently-accessed content provided by the second device and the control data indicating a network location of the more-frequently-accessed content to provide a first data indicating the more-frequently-accessed content and a second data indicating a way to access the more-frequently-accessed content; and selecting the more-frequently-accessed content and the way to access the more-frequently-accessed content.

In accordance with another aspect of the present invention, an apparatus is disclosed. According to an exemplary embodiment, the apparatus comprises a communication interface coupled between first and second data networks, the first data network including a first device having an input for receiving a control data for interactively operating with a second device on the second data network; and a controller coupled to said communication interface for monitoring data traffic between the first and second data networks, the controller analyzing the monitored traffic data to identify a more-frequently-accessed content provided by the second device and the control data indicating a network location of the more-frequently-accessed content to provide a first data indicating the more frequently accessed content and a second data indicating a way to access the more frequently accessed content, and the controller selecting the more-frequently-accessed content and the way to access the more-frequently-accessed content.

In accordance with another aspect of the present invention, an apparatus is disclosed. According to an exemplary embodiment, the apparatus comprises means, such as a microprocessor, for monitoring data traffic between first and second data networks, the first data network including a first device—such as a TV with set top box, a personal computer (PC), a laptop computer, and a mobile Internet device—having an input for receiving a control data for interactively operating with a second device, such as a data server and a time server, on the second data network, such as a network including the Internet; means, such as a microprocessor, for analyzing the monitored traffic data to identify a more-frequently-accessed content provided by the second device and the control data indicating a network location of the more-frequently-accessed content to provide a first data indicating the more-frequently-accessed content and a second data indicating a way to access the more-frequently-accessed content; and means, such as a microprocessor, for selecting the more-frequently-accessed content and the way to access said more-frequently-accessed content.

The above-mentioned and other features and advantages of this invention, and the manner of attaining them, will become more apparent, and the invention will be better understood by reference to the following description of embodiments of the invention taken in conjunction with the accompanying drawings, wherein:

Figure 1:
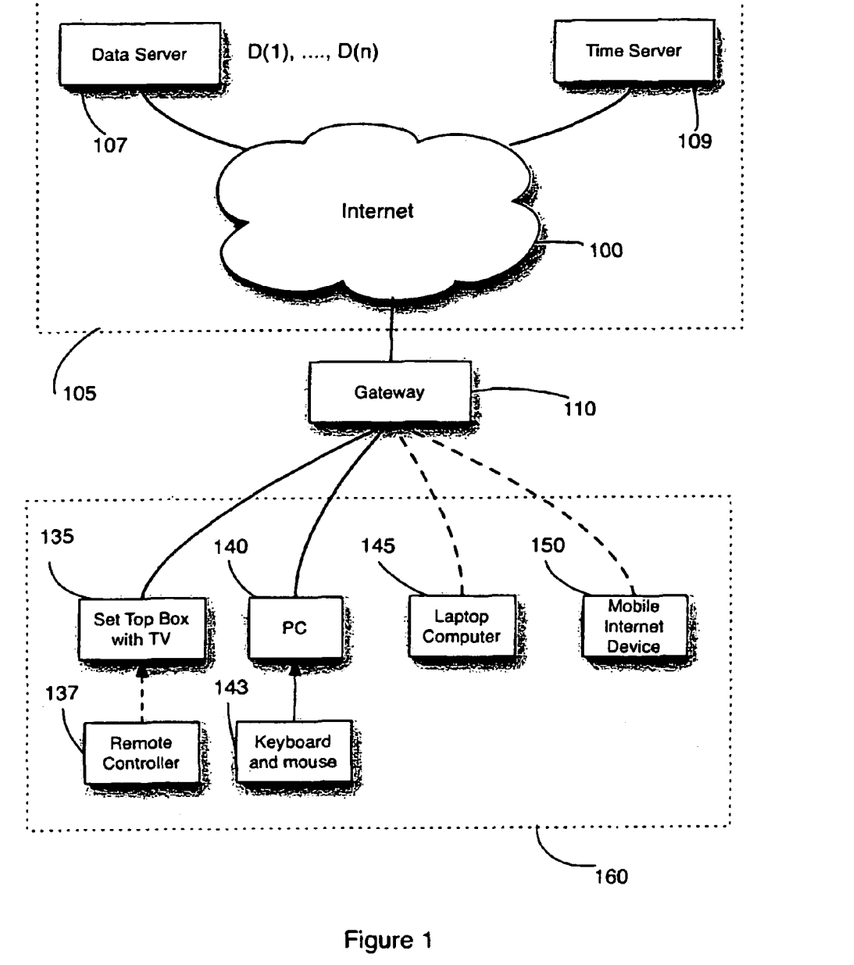
FIG. 1 depicts, in the form of block diagram, a home data network system connected to the Internet via a gateway in which the present invention may be implemented. The gateway interfaces bi-directional data traffic between the internal and external networks.

FIG. 1 describes an exemplary internal local data network system, for a household use, connected to an external data network, including the Internet, via a gateway in which the present invention may be implemented. More specifically, internal network 160 includes internal network devices, such as set top box (STB) with television receiver (TV) 135, personal computer (PC) 140, laptop computer 145, and mobile Internet device (MID) 150. Television receiver (TV) includes a video content display screen and audio content reproduction devices (not shown). Set top box with TV 135 has a user input device, such as remote controller 137, by which a user controls the operation of set top box with TV 135. Set top box with TV 135 is connected to an external IPTV service provider, such as data, server 107, via gateway 110. Data server 107 represents one of a plurality of data servers (D(1), . . . D(n)) on the Internet.

The word "data server" denotes network facilities where a particular information content(s) is (are) physically stored from a network hardware point of view while the word "data site" denotes a network location where a particular information content is available from a user's point of view. Thus, a plurality of data sites may reside on a single data server 107.

The plurality of data servers provide various kinds of information contents, such as webpage contents, IPTV program contents, IP radio program contents, telecommunication contents, and other video, audio, text, and data contents.

Similarly, personal computer 140 has a set of user input devices 143, such as a keyboard and a mouse, by which a user controls the operation of PC 140. PC 140 is connected to an external website, represented by data server 107, via a gateway 110. Laptop computer 145 may include within itself a display screen as well as a set of user input devices, such as a keyboard and a control pad (not shown). Mobile Internet device (MID) 150 may include a touch panel display screen (not shown) as a user input device.

Each one of these internal network devices is bi-directionally connected to external network 105, including Internet 100, via gateway 110 either wirelessly or with a wire. For example, in FIG. 1, set top box 135 and PC 140 are wire connected to gateway 110 while laptop computer 145 and MID 150 are wirelessly connected to gateway 110. In FIG. 1, the wired connections are represented by solid lines, and the wireless connections are represented by dashed lines.

Gateway 110 interfaces between internal data network 160 and external data network 105 including the Internet 100. Thus, all incoming and outgoing data traffic between internal network 160 and external network 105 go through gateway 110. More specifically, such a bi-directional data traffic include not only incoming content data provided by data server 107 but also outgoing control data entered by a user of internal network device 135, 140, 145, 150. For example, the control data may include the data representing universal resource locators (URLs), IPTV/IP radio program channel selections, mouse clicks, and other information entered by the user.

Here, an overall operation of gateway 110 is briefly described with respect to FIG. 1. The detailed operations of each one of the functional modules of gateway 110 will be described later with respect to FIGS. 2 through 6. Gateway 110 features five aspects of operation: (1) Traffic Monitoring, (2) Link-based Content Suggestion, (3) Topic-based Content Suggestion, (4) Content Suggestion on Display Screen, and (5) Topic Updating.

Traffic Monitoring.

Gateway 110 utilizes an implicit data monitoring technique. More specifically, gateway 110 monitors the bi-directional data traffic between data server 107 and internal network devices 135, 140, 145, 150 and collects relevant data. For example, gateway 110 collects the control data entered by a user (or a group of users) of internal network device 135, 140, 145, 150. As described above, such control data may include, but are not limited to, the data representing URL addresses (or program channel numbers in case of IPTV/IP radio), mouse clicks, and other data, including text data, entered by a user with data input device 137, 143. Then the collected control data are time stamped individually—i.e., each one of the data is associated with the time of day and date at which it is being entered by the user.

Gateway 110 has an internal clock, which may periodically be calibrated with the data provided by time server 109. The aggregated control data—which indicate an access history of internal network devices 135, 140, 145, 150—may temporarily and locally be stored in memory for analysis. Alternatively, the monitoring function may be done at each one of internal devices 135, 140, 145, 150, with a utilization of application software in the internal network device.

Link-Based Content Suggestion.

First of all, a content(s) of interest to a user may be determined based upon user's access history to various data sites during a predetermined period of time (such as one week, one month, three months, etc.). More specifically, gateway 110 analyzes the aggregated control data—which indicate the access history of internal network devices 135, 140, 145, 150—so that a group of a plurality of data sites being frequently accessed over the predetermined period of time may be identified. Such aggregated control data may be stored in memory for analysis. Then unnecessary and/or irrelevant data (so-called "noises") will be removed from the access history data. The noises include, for example, the URL data indicating advertisement data sites. The removal of the advertisement site URLs may be done based upon the data provided by a database of advertisement site addresses.

Then noise-removed access history data (i.e., URL data of the previously-accessed data servers excluding the advertisement servers) are ranked in accordance with access frequency, and a group of more-frequently-accessed data sites are identified. For example, the URLs for the top 10 most-frequently accessed data sites may be identified and selected.

Then gateway 110 determines whether or not the content of each one of the selected group of data sites may easily be rendered on an internal network device, such as set top box with TV 135. For example, a content may easily be rendered on set top box with TV 135 if the data site supports the Really Simple Syndication (RSS) feature and/or if the site exhibits the well-structured web pages having easily identifiable headlines and body text. The well-structured pages can easily be converted to the contents suitable for rendering on a television screen. If the content is determined to be suitable for being rendered on at least one of internal network devices 135, 140, 145, 150, the data site providing such a content will be selected for reproduction, and the content will be provided for internal network devices 135, 140, 145, 150 in the manners described under "Content Suggestion on Display" below.

Topic-Based Content Suggestion.

There is a possibility that at least one of the selected group of more frequently-accessed data sites mentioned above contains the content not suitable for being rendered on any one of internal network devices 135, 140, 145, 150—for example, the data site that does not support either RSS feeds or the well-structured web pages. Furthermore, there is also a possibility that none of the selected group of more frequently-accessed data sites mentioned above contains any contents of current interest to a user.

Under such circumstances, instead of using the user's access frequency to a particular data site(s), the content(s) of interest to a user will be determined here by analyzing the contents on the none-selected data sites (i.e., the previously-accessed data sites not having been included in the selected group of more-frequently-accessed data servers, excluding the advertisement servers, determined under the "link-based content suggestion" process described above). That is, the content(s) of interest will be determined based upon the frequency of the appearance of a particular topic(s) in the contents available on the non-selected data sites. In addition, gateway 110 may infer a topic(s) of interest to the user based upon the topic(s) of interest to the same user having already been known to gateway 110. The determination of the content(s) of interest to a user by the "topic-based suggestion" process is described more specifically below.

Gateway 110 monitors the data traffic and collects the incoming content data from a (a group of) non-selected data site(s). The collected content data may temporarily and locally be stored in memory for analysis. Gateway 110 analyze the content(s) available on the non-selected data server(s) to determine its (their) topic(s).

There are a variety of known techniques to identify a topic(s) of the content(s). For example, gateway 110 may employ the semantic analysis. First of all, an analyzable form of data need to be extracted from various types of information contents. Such data include text displayed on web pages, text converted from video graphics or audio narrations, and the closed caption data accompanied with television contents, for example. Then dictionary keywords (e.g. Wikipedia), for example, may be used to identify a topic(s) of the content(s). Any collected metadata that could help gateway 110 properly identify the topic(s), such as program guide data to determine IPTV contents, may also be used. The topic(s) identified out of the noise-removed content(s) on the non-selected data site(s) is (are) hereinafter called as "the additional topic(s)" in the present application.

In the same manner, gateway 110 also analyzes the content(s) on the group of selected more-frequently-accessed data sites to identify a topic(s) of their content(s). Then the topic(s) identified for the selected, site(s) is (are) compared to the additional topic(s) identified for the non-selected site(s) to identify redundant topic(s) so that the redundant topic(s) may be subtracted from the additional topic(s) for removal. Gateway 110 selects one or a group of the redundancy-subtracted additional topic(s), for example, the top ten additional topics, as a (a group of) more-frequently-identified topic(s). Using an Internet search engine, the easy-to-render content(s), relevant to such a more-frequently-accessed topic(s), will be located as the content(s) of interest to a user. The content(s) will be provided for at least one of internal network devices 135, 140, 145, 150 for retrieval in the manner described under "Content Suggestion on Display" below.

Content Suggestion on Display Screen.

Once the content(s) of interest to a user has (have) been determined in one of the two manners disclosed above (i.e., by the link-based suggestion or by the topic-based suggestion) or any combination thereof, such a content(s) will be automatically provided for at least one of internal network devices 135, 140, 145, 150.

Here, gateway 110 determines a way to access the content(s), including when and where such a content(s) may be available, based upon the data traffic that has been collected and analyzed by gateway 110 as disclosed above. The collected and analyzed data traffic include, but are not limited to, the time-stamped user input data, program guide data, graphic-to-text converted data. Here, for example, gateway 110 may identify the URL(s) of data site(s) 107 that contains (contain) the content(s) of interest to the user as well as a particular time and day at which such data may be available (e.g., always in case of ordinary web contents). Alternatively, gateway 110 may identify a channel number(s) of the video and/or audio content(s) of interest to a user in case of IPTV or Internet radio as well as a particular time(s) and day(s) at which such a program(s) may be available—i.e., its (their) broadcast schedule.

The content(s) of interest to the user will be provided for at least one of internal network devices 135, 140, 145, 150 in various manners. One way may be to provide the content(s) directly to an internal network device. For example, in case of multiple television contents, such contents may be provided over a single program channel or a plurality of program channels. The content(s) of interest may be displayed on a television screen in various formats. For example, the content(s) may be displayed along with the currently-watched program, as a side-by-side screen(s) or a picture-out-picture screen(s), or may be displayed over the currently-watched program as a picture-in-picture screen(s). The various types of display formats can be provided by virtue of small application software, so-called "widget" or "widgets," installed in internal network devices 135, 140, 145, 150. Furthermore, gateway 110 may pre-fetch the content(s) and store it (them) locally for easy access.

Another way may be to show one or a list of hyper-link(s) to the content(s), on the display screen, from which the user may choose using user input device 137, 143.

Topic Updating.

Gateway 110 constantly monitors, collects, and analyzes the data traffic to identify any changes over the topic(s) of interest to a user and/or any modification over the content(s) relevant to the topic(s). If new topic(s) of interest to the user is (are) identified, gateway 110 will search for the new content(s) relevant to the new topic(s) and notify the user of it in a timely fashion. If the modification occurs over the content(s) relevant to the topic(s) of interest, the pre-fetched and stored contents may automatically be updated accordingly.

Figure 2:
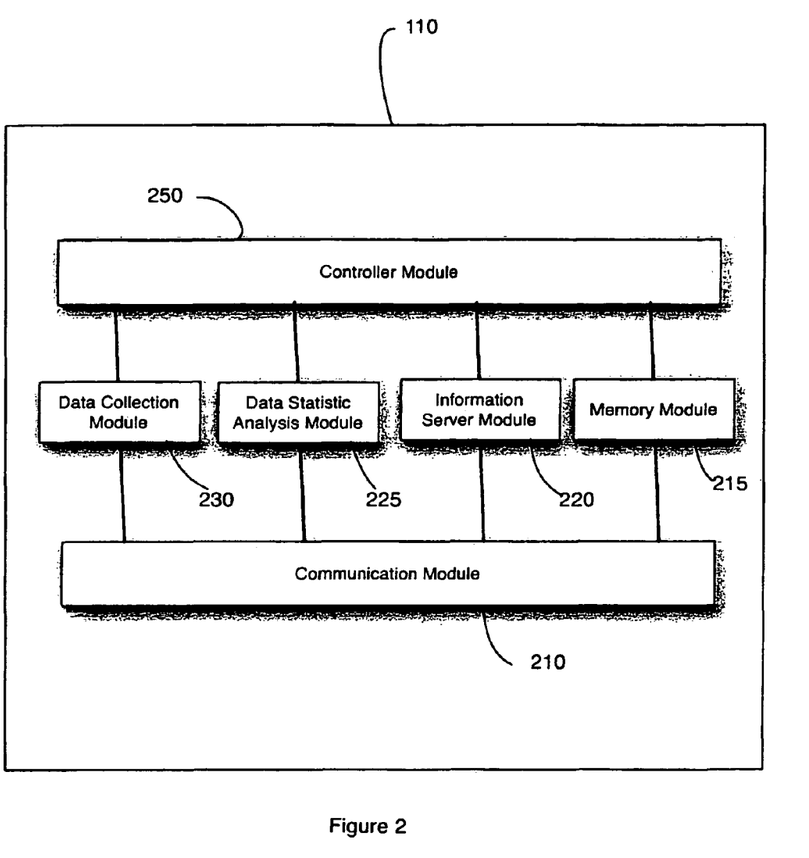
FIG. 2 depicts, in the form of block diagram, a software-module representation of a preferred embodiment in accordance with a principle of the present invention.

In FIG. 2, a software-module representation of gateway 110 is described. More specifically, gateway 110 includes six functional modules—control module 250, data collection module 230, data statistic analysis module 225, information server module 220, memory module 215, and communication module 210. Control module 230 controls and coordinates the operations of other five modules as illustrated by the solid-line connections. Communication module 210 interfaces the data communication between internal data network 160 and external network 105, including the Internet 100. The same reference numbers are used to denote the same functional component in FIGS. 2 and 6.

Data collection module 230 monitors the bi-directional data traffic between internal data network 160 and external data network 105. Furthermore, data collection module 230 collects the relevant portions of the data traffic. The collected traffic data may include, but are not limited to, the outbound control data entered by a user of the internal network—such as the data representing URLs, television/radio program channel numbers, keyboard inputs, and mouse clicks. The collected data may also include, but are not limited to, the inbound content data provided by data servers 107—such as closed caption data, which may be necessary for gateway 110 to determine the topic(s) of the content(s) accessed by the user. Data collection module 230 temporally stores the collected data in memory module 215 for subsequent analysis by data statistic analysis module 225. In addition, data collection module 230 monitors the data provided by time server 109 in order to calibrate a local clock with time server 109 periodically.

Data statistic analysis module 225 analyzes the stored traffic data to determine one or a group of more-frequently-accessed Internet site(s), residing on data servers 107, and a way(s) to access the contents available on the site(s). Furthermore, the collected data may be time-stamped and correlated in accordance with a time of day and day of week at which each one of the Internet sites was accessed by a user.

The collected data may include the data that is (are) not relevant in determining the Internet site(s) of interest to the user. The irrelevant contents include, for example, the URL links to advertisement web pages. Data statistic analysis module 225 removes such irrelevant data (so-called "noises"). This noise removal function will be described more specifically below with respect to FIG. 4. Then data statistic analysis module 225 ranks the noise-less data in accordance with an access history of the user and provides the results for information server module 220.

As to the topic-based content suggestion process described above, information server module 220, including inference engine, may infers an additional topic(s) of interest to a user (or a group of users, such as an entire household) based upon the known topic(s) of interest to the same user provided by data static analysis module 225. Then information server module 220 selects the inferred topic(s) included in the more-frequently accessed contents as well as the way to access such contents and provides the contents themselves and/or the links to such contents (e.g., IPTV program channels and available time of day and day of week) for the internal devices, 135, 140, 145, 150. This selection process will be described more specifically below with respect to FIG. 3.

Information server module 220 may prefetch the content(s) on one or a group of the more-frequently-accessed Internet site(s) determined by data statistic analysis module 225. For example, assuming one of a group of the more-frequently-accessed site(s) contains (contain) local weather information, information server module 220 infers that the local weather information is at least one of the contents of interest to the user. Then the latest local weather information may be prefetched and temporarily stored in memory module 215 for display with respect to a particular postal code having been entered by a user.

In addition, information server module 220 may periodically update the prefetched contents stored in memory module 215. For example, the weather information may be replenished for update in every ten minutes.

In one embodiment, information server module 220 may access another Internet site to locate the same or related information concerning the topic of interest to a user, such as the related weather information that is not included in the prefetched content(s), and stores it (them) as an additional content(s) of interest. In this manner, information server module 220 may provide a collected version of prefetched weather information for the user via any one of active devices 135, 140, 145, 150 of internal network 160 in a timely fashion (e.g., as soon as a user turns on one of the internal devices).

Figure 3:
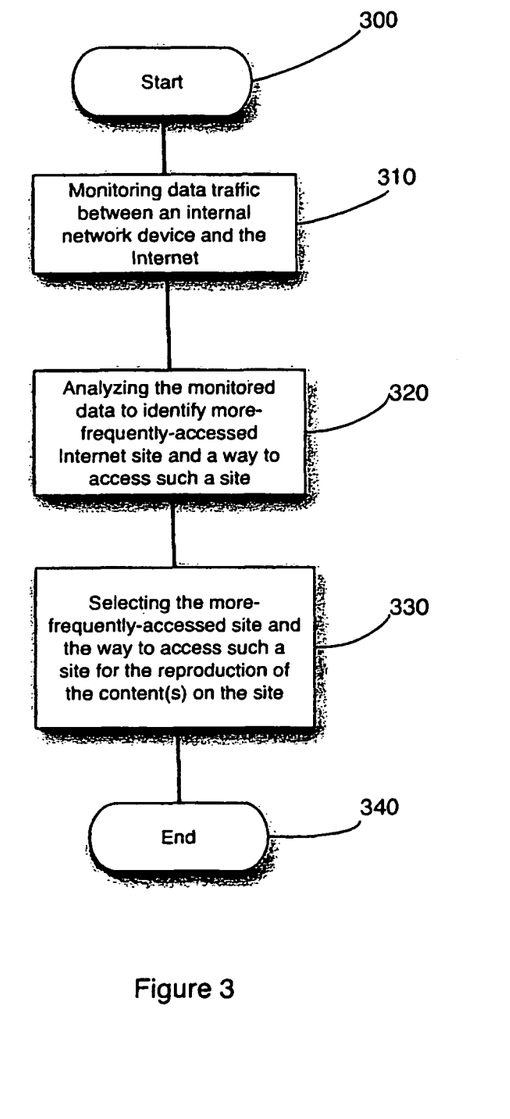
FIG. 3 depicts a flowchart describing an operation of a preferred embodiment, which provides an information content of interest to a user in accordance with a principle of the line-based content suggestion aspect of the present invention.

FIG. 3 describes in the form of flowchart steps for automatically providing a local internal network user with personalized information (i.e., the contents of interest to the user) based upon an access history of user to a group of specific Internet sites. The overall function of this process has been described above as the "link-based content suggestion" in conjunction with FIG. 1. This is one way, disclosed herein, to provide a user with and/or suggest to a user the content(s) of interest to the user automatically.

At step 300, a user of one of internal network device, 135, 140, 145, 150 turns on the device. Internal device 135, 140, 145, 150 accesses to an Internet site, residing on data server 107, on external network 105 to download information contents from the site.

At step 310, the data traffic between internal device 135, 140, 145, 150 and the Internet site is monitored at communication module 210. Data collection module 230 selectively collects the control data entered by the user (such as URL data, data entered by a keyboard, mouse click data, etc.) and may temporarily store the collected data in memory module 215 for analysis. For example, in case of a computer-type internal device (such as PC 140, laptop computer 145, and MID 150), the data indicating an access history of internal devices 135, 140, 145, 150 are collected and temporally stored in memory module 215 for analysis by data statistic analysis module 225.

Alternatively, the control data entered by the user concerning particular internal devices may be monitored and collected individually at each one of internal devices 135, 140, 145, 150 and may be reported back to data collection module 230 by virtue of data collection software installed in the devices. For example, set top box with TV 135 may have a data traffic monitoring software, which has been downloaded from an Internet site via communication module 210. This program records the traffic data relevant to an access history of set top box with TV 135 (such as the data indicating time, date, and channel selection) and reports them back to data statistic analysis module 225.

At step 320, data statistic analysis module 225 analyzes the collected data, which have been aggregated for a predetermined period of time, to identify one or a group of more-frequently-access Internet sites, such as Internet Service Providers (ISPs), based upon an access history of the user.

At step 330, information server module 220, working with data statistic analysis module 225, identifies one or a group of more-frequently-accessed Internet site(s), residing on data servers 107, as well as a way(s) to access to the content(s) on such an Internet site(s), based upon the access history of the user for a predetermined period of time—such as one week, one month, three months, etc. The way(s) to access to the content(s) includes (include), but is (are) not limited to, URL link data for web pages and program channel data for IPTV providers. For example, the top ten most-frequently-accessed ISPs may be identified as the Internet site(s) having the more-frequently-accessed contents. Here, the user may be able to add one's favorite ISP(s) manually to the top ten most-frequently-accessed ISPs.

Then information server module 220 stores in memory module 215 the data concerning the or the group of more-frequently-accessed data site(s) as well as the way(s) to access the content(s) on the Internet site(s). When the user turns the same internal device again next time, information server module 220 automatically selects the or the group of more-frequently-accessed content(s) and provides the way(s) to access to such a content(s) for the device so that the device can automatically suggest or deliver the contents of interest to the user in the various manners described with respect to the content suggestion on display screen above.

Alternatively, information server module 220 may prefetch the content(s) of interest to the user and store the content(s) itself (themselves), as well as the way(s) to access to such a content(s) in memory module 210. This may be done preferably before the user activates the internal device again so that the user may enjoy such a content(s) faster.

As mentioned above, the prefetched content(s) stored in memory module 210 may be updated periodically. For example, assuming that a content of interest to the user is the latest market price of a particular stock, then information server module may periodically update, every fifteen minutes for example, the stock price stored in memory module 210 so that the user may obtain the latest prince in a timely fashion.

Since local internal data network 160 may include a plurality of internal devices 135, 140, 145, 150, the collective data concerning an access history of all internal network devices may not properly represent the information contents of interest to a particular user, such as a particular individual of a household. Here, information server module 220 may discriminate the particular individual from the rest of household members' based upon one's distinctive access pattern and/or usage of internal network device(s). That is, information server module 220 having an inference engine may infer or recognize a distinctive access pattern and/or a usage of internal network device(s) of the particular individual based upon the collective input data entered by the individual—such as a time of day, a day of week, and the distinctive selections of Internet sites made by the individual.

In general, for example, the information contents preferred by women may be different from those preferred by men, and the information contents preferred by adults may be different from those preferred by children. Such preferences may be used by information server module 220 to identify one particular individual from the rest of family members. Needless to say, distinctive user identification data and/or associated user profile data may be entered manually by the user with input device 137, 143. Information server module 220 allocates the personalized more-frequently-accessed Internet sites to a particular user of internal data network 160 based upon a distinctive pattern of the collective data entered by the user with input device 137, 143.

At step 340, information server module 220, under the control of controller module 250, need not stay idle. Rather, information server module 220 may continue to explore the available program channels in case of IPTV or surf the web contents for additional Internet site(s) of interest to the user and for any updated content(s) for the content(s) prefetched and stored in memory module 215.

The content(s) on the selected site or group of sites will be delivered to the internal network device in the various manners described above with respect to the content suggestion on display screen.

Figure 4:
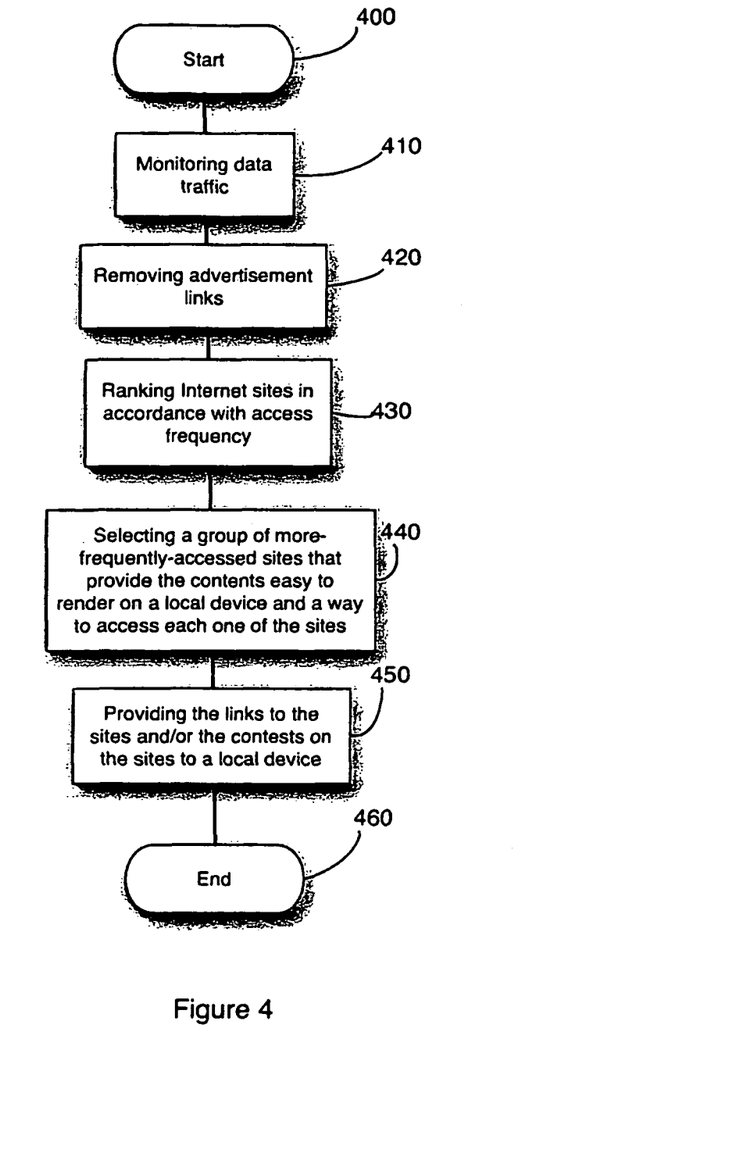
FIG. 4 depicts a flowchart describing an operation of a preferred embodiment, which provides a noise-removed information content of interest to a user in accordance with a principle of the present invention.

Referring now to FIG. 4, an enhanced process for automatically providing personalized information contents to a user is shown. At step 400, a user of internal network device, 135, 140, 145, 150 turns on the device. Then the device accesses to an Internet site, residing on data server 107, on external network 105 for downloading information contents from there.

At step 410, communication module 210 monitors the data traffic between internal device 135, 140, 145, 150 and Internet sites. Data collection module 230 selectively collects the bi-directional traffic data between internal network 160 and external 105 network. Such bi-directional traffic data include, but are not limited to, the control data entered by a user with user input device 137, 143.

At step 420, undesirable or irrelevant data (so-called "noises") are removed from the collected traffic data. The noises include, but are not limited to, the URL data that link to advertisement contents. Here, noise links may automatically be removed in reference to the information on an advertisement database site. Data collection module 230 may time stamp and store the noiseless control data in memory for analysis.

At step 430, data statistic analysis module 225 ranks the noise-less access history data—such as aggregated URL data in case of web contents and aggregated IPTV program channel numbers in case of IPTV—in accordance with their access frequency.

At step 440, information server module 220, working with data statistic analysis module 225, identifies one or a group of more-frequently-accessed Internet site(s), residing on data servers 107, as well as a way(s) to access to the content(s) on such an Internet site(s), based upon the access history of the user for a predetermined period of time in the same manner as described with respect to step 330 of FIG. 3 above.

When the user turns the same internal device next time, information server module 220 automatically selects the or the group of more-frequently-accessed site(s) and the way(s) to access the content(s) on the site(s) in the same manner as described with respect to step 330 of FIG. 3 above.

At step 450, the contents on the selected site or group of sites will be delivered to the internal network device in the various manners as described with respect to the content suggestion on display above.

At step 460, information server module 220 may continue to explore the available program channels in case of IPTV or surf the web contents for additional Internet site(s) of interest to the user and for any updated content(s) for the content(s) prefetched and stored in memory module 215 as described with respect to step 340 of FIG. 3.

Figure 5:
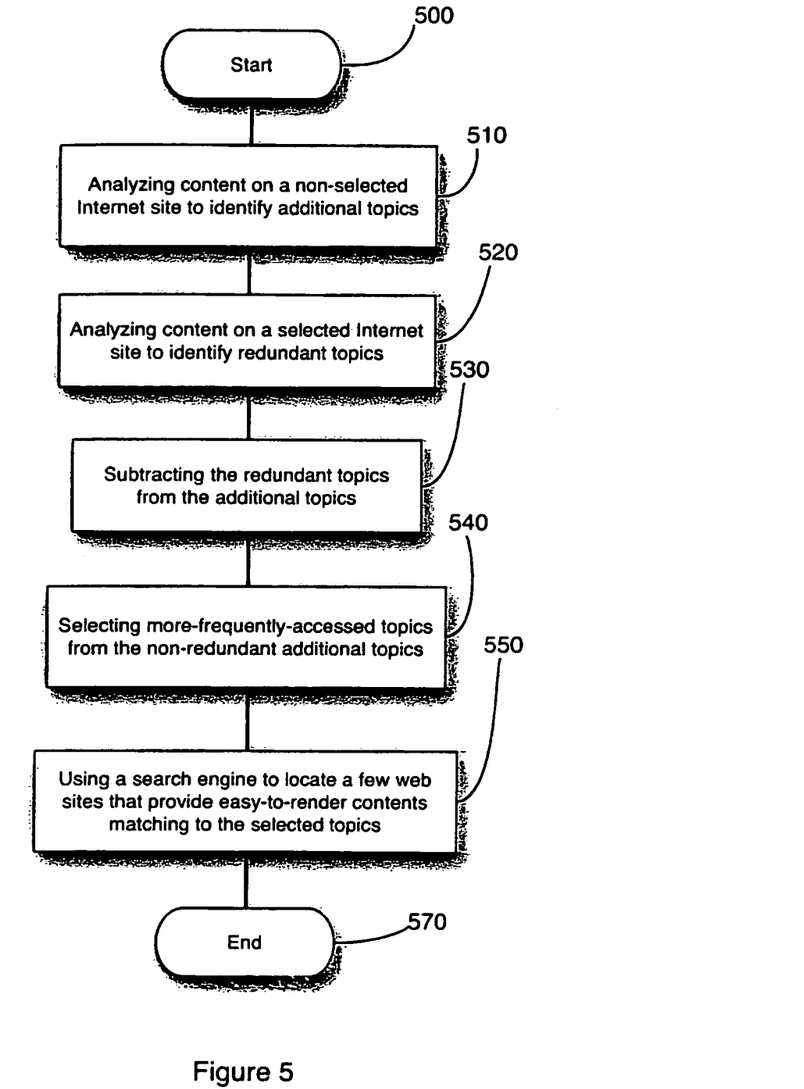
FIG. 5 depicts a flowchart describing an operation of a preferred embodiment, which provides an information content of interest to a user in accordance with a principle of the topic-based content suggestion aspect of the present invention.

FIG. 5 shows a flowchart describing an operation for determining a or a group of more-frequently-accessed content(s) based upon a topic(s) of the actual content(s) on available an Internet site(s). This is another way, disclosed herein, to provide a user with and/or suggest to a user the content(s) of interest to the user automatically. The overall function of this process has been described above as the "topic-based content suggestion" in conjunction with FIG. 1. This process may be employed especially when the content(s) available on some or all of the more-frequently-accessed Internet sites, determined by the "link-based content suggestion" described above, are not suitable for rendering on any one of internal network devices 135, 140, 145, 150 as described above with respect to the "topic-based content suggestion."

At step 500, a user of one of internal network device, 135, 140, 145, 150 turns on the device. Internal device 135, 140, 145, 150 accesses to an Internet site, residing on data server 107, on external network 105 to download information contents from the site.

At step 510, controller module 250 actuates information server module 220 to access and analyze the content(s) on one or a group of non-selected sites for identifying an additional topic(s) of interest to the user. The non-selection sites are the Internet sites that were not selected, during the "link-based suggestion" process, as more-frequently-accessed Internet sites. That is, the non-selected site(s) is (are) the site(s) that has (have) been accessed before but was (were) not selected as part of the more-frequently-accessed sites. The prefetched content(s) of and/or the control data concerning a way(s) to access the non-selected site(s), such as URL link(s), may have already been stored in memory module 215. It is noted that the URL links for advertisement sites may have been removed from the data stored in memory module 215 as described with respect to the step 420 of FIG. 4. Thus, the content(s) of the non-selected site(s) may be retrieved from memory module 215 or be downloaded directly from the site(s) for analysis.

More specifically, information server module 220 analyzes the content(s) of the non-selected site(s). There are several ways, known to one skilled in the art, to identify an additional topic(s) of contents, such as the semantic analysis, as described above with respect to the "topic-based content suggestion." For example, the additional topic(s) of interest may be identified based upon the frequency of the appearance of a particular topic(s) in the content(s). Alternatively or in addition, information server module 220 may infer a few related topic(s) as additional topic(s) of interest based upon the topic(s) of interest, to the same user, that have already been known to gateway 110.

At step 520, information server module 220 accesses one or a group of the selected sites—i.e., the Internet site(s) that has (have) been identified as one or a group of more-frequently-accessed site(s)—and analyzes its (their) content(s) to identify the topic(s) of interest to the user in the same fashion. For example, assuming a user is interested in local weather information, information server module 220 may infer, as an additional topic of interest, the barometric pressure from its known topic of interest to the user, for example, temperature.

At step 530, comparing the additional topic(s) of interest, found on the non-selected sites, with the topic(s) of interest, found on the selected sites, formation server module 220 identifies any redundant topic(s) of interest and subtracts the redundant topic(s) from the additional topic(s) of interest so that the redundant topic(s) may be removed. It is noted, however, that some redundant topic(s) of interest may still be useful if, for example, a plurality of contents referred by the redundant topic are different—e.g., one content may be newer than the other content. Then, the latest content should replace the older one for the redundant topic of interest.

For example, the obsolete temperature of 72° F. (22° C.) in Princeton, N.J. that was read one hour ago may be replaced with the latest value of 68° F. (20° C.) that was read more recently. This is a content updating process. Alternatively, if the exactly same value of data is found in two different sites, one of them may simply be eliminated. This is an elimination process for redundant contents.

Furthermore, even if the exactly same value of data, in various formats, are found in a plurality of different sites, information server module 220 may render a particular form of data, for retrieval, which is most suitable for a particular type of the internal network device used by a user. For example, multimedia contents may be rendered for set top box with display 135 while text only data may be rendered for a simple mobile Internet device (MID) 150, such as a PDA.

At step 540, information server module 220 selects one or a group of genuine additional topic(s) of interest, which refers (refer) to no redundant contents, for further processing. Here information server module 220 may infer a few topics related to the additional topic(s) and adds them to the additional topic(s) of interest.

For example, assuming a user is interested in the flight information from one location, such as New York City, to another location, such as Los Angeles, on a particular day, such as on July 4th, via a single air line. Here, a topic of interest to the user is the flight information from New York City to Los Angeles on July 4th on airline "A." The additional topic of interest provided by one of the non-selected sites might be the additional flight information from New York City to Los Angles on July 4th provided by another airline, such as airline "B." Based upon the known fact that the user is interested in the flight information from New York City to Los Angeles on July 4th on airline "A," information server module 220 infers that the user may also be interested in similar contents provided by airline B's web site and selects such a related content as well.

At step 550, information server module 220 may utilize a known search engine(s) to locate an Internet site(s) that carries (carry) the same value of data in a different format(s) so that the data on a format suitable for a particular type of internal network device 135, 140, 145, 150 may be rendered. Such Internet sites may includes, but are not limited, to web sites using RSS, IPTV content servers, and IP telephony servers.

At step 570, information server module 220 may continue to explore the available program channels in case of IPTV or surf the web contents for additional topics of contents of interest to a user.

Figure 6:
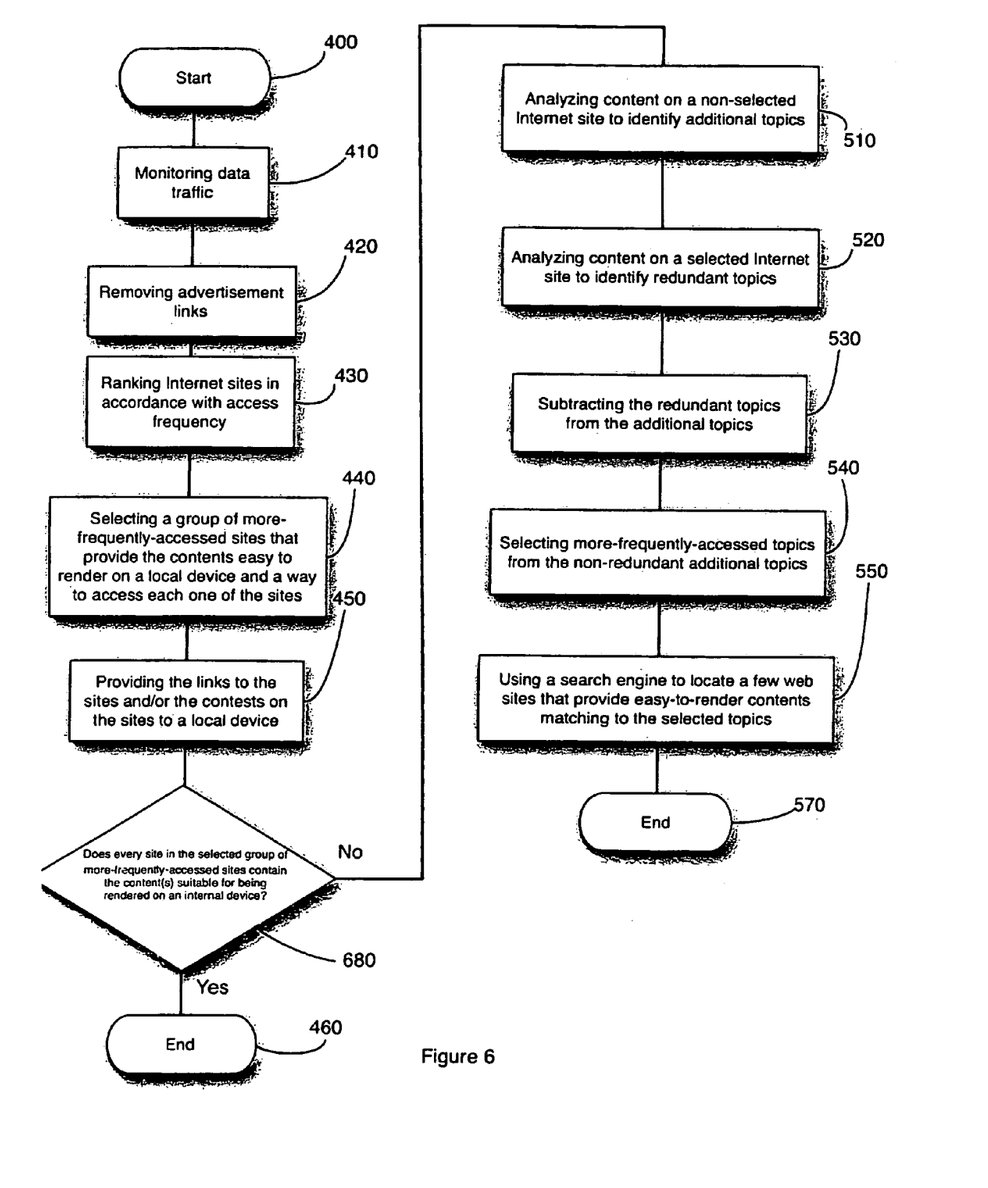
FIG. 6 depicts a flowchart describing an operation of a preferred embodiment, which provides an information content of interest to a user in accordance with a combined principles of the link-based content suggestion and the topic-based content suggestion aspects of the present invention.

The two processes disclosed in FIGS. 4 and 5, respectively, may be combined in series as shown in FIG. 6. That is, at step 680, after performing the link-based content suggestion process shown in FIG. 4, the system may move to the topic-based content suggestion process shown in FIG. 5 if at least one of the selected group of more-frequently-accessed data sites contains the content not suitable for being rendered on any one of the internal network devices 135, 140, 145, 150.

Figure 7:
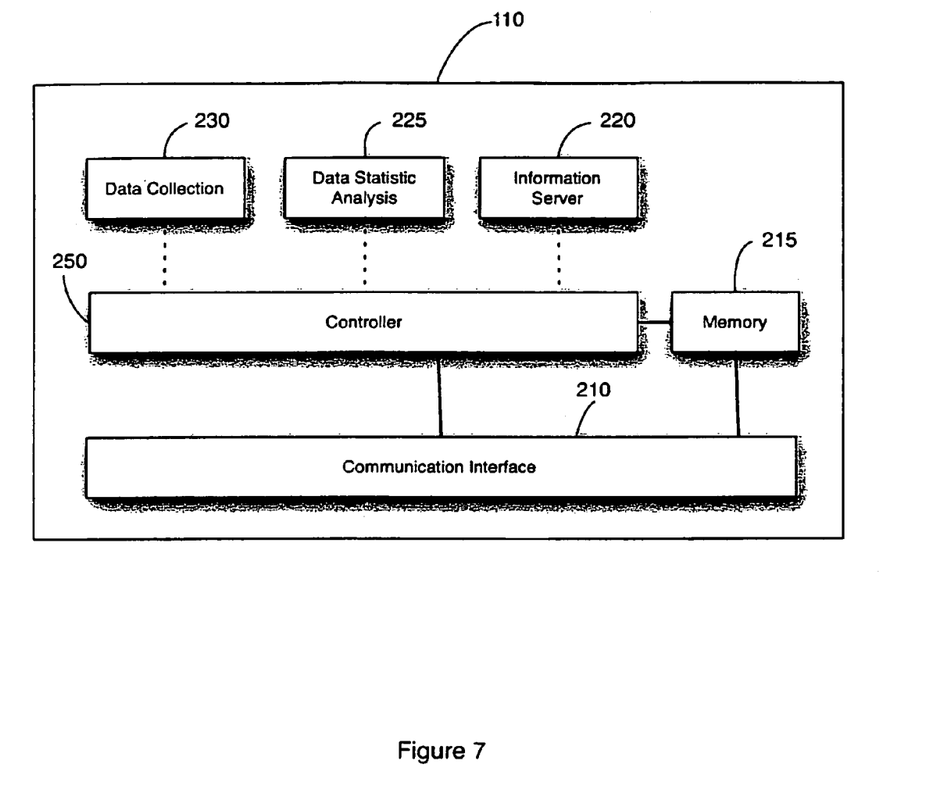
FIG. 7 depicts, in the form of block diagram, a physical structural arrangement of the functional elements of a preferred embodiment in accordance with a principle of the present invention.

FIG. 7 illustrates, in the form of block diagram, a physical structural arrangement of the functional elements of a preferred embodiment in accordance with principle of the present invention. More specifically, FIG. 7 describes a hardware-type representation of the relevant functional components of gateway 110 while FIG. 2 describes a software-type representation of those of 110 gateway.

Here, controller module 250 of FIG. 2 is represented as controller 250 specifically programmed to perform certain predetermined functions. Data collection 230 corresponds to data collection module 230 of FIG. 2. Data statistic analysis 225 corresponds to data statistic analysis module 225 of FIG. 2. Information server 220 corresponds to information server module 220 of FIG. 2. Memory 215 corresponds to memory module 215 of FIG. 2. Communication interface 210, which interfaces between internal data network 160 and external data network 105, corresponds to communication interface module 210 of FIG. 2.

In FIG. 7, solid lines are intended to represent physical connections between the identified blocks while dashed lines are intended to represent logical links between the identified blocks. That is, the logical connections between data collection 230, data statistic analysis 225, information server 220, and controller 250 are represented by three dashed lines, respectively. Data collection 230, data statistic analysis 225, and information server 220 are controlled by controller 250, and controller 250 may incorporate all or part of these hardware components within itself in the form of software as described in FIG. 2. Data is assumed to flow in both directions between all such logical and physical connections. Furthermore, controller 250 may physically include all or part of memory 215 within an integrated chip or module as the solid line between controller 250 and memory 215 represent a physical connection. Communication interface 210 may be eliminated in some embodiments.

Memory 215 may directly receive data traffic collected via communication interface 210 and/or may store data output of controller 250 by the collaborative operations of data collection 230, data statistic analysis, and information server 220 under the control of controller 250.

Though the above scheme of the present invention has been described with respect to the data traffic between a local internal network and an external network including the Internet, the scheme could be used in any kind of network that involves information content flow with or without the Internet. It is to be understood that the present invention may be implemented in various forms of hardware, software, firmware, special purpose processors, or a combination thereof. Preferably, the present invention is implemented as a combination of hardware and software.

Moreover, the software is preferably implemented as an application program tangibly embodied on a program storage device which may be contained in whole or in part on tangible media of expression, such as a hard disc or a detachable memory device. The application program may be uploaded or downloaded to, and executed by, a machine comprising any suitable architecture.

In one embodiment; the apparatus, such as gateway 110 or internal network device 135, 140, 145, 150, may be implemented on a computer platform having hardware—such as one or more central processing units (CPU), a random access memory (RAM), and input/output (I/O) interface(s).

The computer platform also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention. It is, therefore, to be understood that numerous modifications may be made to the illustrative embodiments and that other arrangements may be devised without departing from the spirit and the scope of the present invention.

The invention claimed is:

1. A method comprising:
monitoring data traffic at a gateway coupling between first and second data networks, said first data network comprising a plurality of devices for accessing content, said devices having an input for receiving user selection of contents and said second network comprising a plurality of content servers to deliver a plurality of contents, said monitoring comprising collecting control data and associating time stamps to the collected data, said control data defining where and how to obtain the content;
analyzing said data traffic to identify a group of contents that are more-frequently-accessed by the plurality of devices, wherein data are collected and time-stamped and correlated in accordance with time of day and day of week at which each one of the content servers was accessed by a user to determine an access pattern for each of said more-frequently-accessed contents, wherein collected time-stamped data are inferred from previous user selections;
pre-fetching the more-frequently-accessed contents according to their control data and collected time-stamped data;
storing the pre-fetched contents; and
delivering the stored more-frequently-accessed contents to at least one of the plurality of devices for accessing to content, and
periodically updating the stored pre-fetched content, wherein the updating is performed according to the collected time-stamped data of the stored pre-fetched content and comprises pre-fetching the more-frequently-accessed contents according to their control data and storing said pre-fetched contents so that said pre-fetched content is updated timely and is delivered to at least one of the plurality of devices for accessing content before a further selection by the user.

2. The method of claim 1, wherein said device for accessing content includes at least one of a set top box capable of being coupled to a display screen, a computer, and a mobile internet device.

3. The method of claim 1, wherein said content server includes at least one of a world-wide-web server, an IPTV content server, an Internet radio content server, and an Internet telephony server.

4. The method of claim 1, wherein said control data includes at least one of data representing universal resource locators (URLs), data representing a selection of IPTV program, and a data representing a selection of Internet radio program.

5. An apparatus comprising:
a communication interface that couples first and second data networks, said first data network comprising a plurality of devices for accessing to content, said devices having an input for receiving user selection of contents and said second network comprising a plurality of content servers to deliver a plurality of contents;

a controller coupled to said communication interface and configured to:
monitor data traffic between said first and second data networks,
said monitoring comprising collecting control data and associating time stamps to the collected data, said control data defining where and how to obtain the content;
analyze said data traffic to identify a group of contents that are more-frequently-accessed by the plurality of devices wherein data are collected and time-stamped and correlated in accordance with a time of day and day of week at which each one of the content servers was accessed by a user to determine an access pattern for each of said more-frequently-accessed contents, wherein collected time-stamped data are inferred from previous user selections;
pre-fetch the more-frequently-accessed contents according to their control data and collected time-stamped data; and
memory to store the pre-fetched contents;
wherein the communication interface is further configured to deliver the stored more-frequently-accessed contents to at least one of the plurality of devices for accessing to content, and
wherein the controller is further configured to periodically update the stored pre-fetched content, wherein the update is performed according to the collected time-stamped data of the stored pre-fetched content and comprises pre-fetching the more-frequently-accessed contents according to their control data and storing said pre-fetched contents so that said pre-fetched content is updated timely and is delivered to at least one of the plurality of devices for accessing content before a further selection by the user.

6. The apparatus of claim 5, wherein said device for accessing to content comprises at least one of a set top box capable of being coupled to a display screen, a personal computer capable of being coupled to a display screen, a laptop computer with a display screen, and a mobile internet device.

7. The apparatus of claim 5, wherein said content server comprises at least one of a world-wide-web server, an IPTV content server, an Internet radio content server, and an Internet telephony server.

8. The apparatus of claim 5, wherein said control data comprises at least one of data representing universal resource locators (URLs), data representing a selection of IPTV program, and a data representing a selection of Internet radio program.

* * * * *

EX PARTE REEXAMINATION CERTIFICATE (12568th)

United States Patent
Li et al.

(10) Number: US 10,015,064 C1
(45) Certificate Issued: Apr. 5, 2024

(54) PERSONALIZATION OF INFORMATION CONTENT BY MONITORING NETWORK TRAFFIC

(75) Inventors: Dekai Li, Lawrenceville, GA (US); Ashwin Kashyap, Mountain View, CA (US); Saurabh Mathur, Monmouth Junction, NJ (US)

(73) Assignee: ADAPTFLOW TECHNOLOGIES LLC, Waco, TX (US)

Reexamination Request:
No. 90/015,248, Jun. 6, 2023

Reexamination Certificate for:
Patent No.: 10,015,064
Issued: Jul. 3, 2018
Appl. No.: 13/817,216
PCT Filed: Aug. 19, 2010
PCT No.: PCT/US2010/002303
§ 371 (c)(1),
(2), (4) Date: Feb. 15, 2013
PCT Pub. No.: WO2012/023921
PCT Pub. Date: Feb. 23, 2012

(51) Int. Cl.
| | |
|---|---|
| *G06F 15/16* | (2006.01) |
| *H04L 12/26* | (2006.01) |
| *H04L 29/08* | (2006.01) |
| *H04L 43/04* | (2022.01) |
| *H04L 67/303* | (2022.01) |
| *H04L 67/50* | (2022.01) |
| *H04N 21/442* | (2011.01) |
| *H04N 21/462* | (2011.01) |
| *H04N 21/466* | (2011.01) |
| *H04N 21/482* | (2011.01) |
| *H04N 21/436* | (2011.01) |

(52) U.S. Cl.
CPC ............ *H04L 43/04* (2013.01); *H04L 67/303* (2013.01); *H04L 67/535* (2022.05); *H04N 21/44224* (2020.08); *H04N 21/4622* (2013.01); *H04N 21/4667* (2013.01); *H04N 21/4668* (2013.01); *H04N 21/4826* (2013.01); *H04N 21/43615* (2013.01)

(58) Field of Classification Search
None
See application file for complete search history.

(56) References Cited

To view the complete listing of prior art documents cited during the proceeding for Reexamination Control Number 90/015,248, please refer to the USPTO's Patent Electronic System.

*Primary Examiner* — Adam L Basehoar (57) ABSTRACT

A home network system that personalizes the selection of information content in accordance with an interest of a user of the network is disclosed. More specifically, a method and apparatus are described for automatically presenting an information content of interest to the user. being provided by an Internet site external to the network. The contents of interest may be determined in accordance with an access pattern of the user and a frequency of the use of particular topic in the content.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*